(12) United States Patent
Biskeborn et al.

(10) Patent No.: US 8,310,778 B2
(45) Date of Patent: Nov. 13, 2012

(54) DUAL ACTUATOR FOR A READ-WRITE DATA STORAGE DEVICE

(75) Inventors: Robert G. Biskeborn, Hollister, CA (US); Evangelos S. Eleftheriou, Rueschlikon (CH); Mark A. Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 12/391,379

(22) Filed: Feb. 24, 2009

(65) Prior Publication Data
US 2010/0214688 A1 Aug. 26, 2010

(51) Int. Cl.
*G11B 21/02* (2006.01)
(52) U.S. Cl. ............... 360/75; 360/77.12; 360/78.02
(58) Field of Classification Search .................. None
See application file for complete search history.

(56) References Cited

U.S. PATENT DOCUMENTS

| 7,054,093 | B1 | 5/2006 | Anderson et al. | |
|---|---|---|---|---|
| 7,054,097 | B1 | 5/2006 | Yip et al. | |
| 7,312,945 | B2 * | 12/2007 | Langlois et al. | 360/77.01 |
| 7,342,738 | B1 | 3/2008 | Anderson et al. | |
| 2007/0058298 | A1 * | 3/2007 | Harper et al. | 360/261.1 |

* cited by examiner

*Primary Examiner* — Holly Rickman
(74) *Attorney, Agent, or Firm* — Cantor Colburn LLP; Daniel Morris

(57) ABSTRACT

A data storage device includes a first head module independently moveably mounted relative to the storage device. The first head module includes at least one of a read element and a write element. In addition, the data storage device includes a second head module independently moveably mounted relative to the storage device. The second head module includes at least one of a read element and a write element operatively associated with the at least one of a read element and write element of the first head module. The second head module is selectively shiftable relative to the first head module in order to align the at least one of the read element and the write element of the first head module and the at least one of the read element and the write element of the second head module to one another.

13 Claims, 5 Drawing Sheets

DUAL ACTUATOR FOR A READ-WRITE DATA STORAGE DEVICE

BACKGROUND

The present invention relates to the art of dual actuators and, more specifically, to a dual actuator for a read-write data storage device.

Modern magnetic tape based data storage devices simultaneously perform read and write operations in order to enhance system speed and reliability. Generally, the simultaneous read/write operation is achieved through the use of dual heads fixedly mounted to one another with each head having multiple readers and writers. More specifically, readers on one head are aligned with writers on another head so that data can be written and verified in a single operation. In this manner, system speed is enhanced while, at the same time, an overall error rate is reduced. That is, if too many read errors are detected, data is re-written without interruption in device operation.

SUMMARY

According to one exemplary embodiment of the invention, a data storage device includes a main body supporting a first storage media holder and a second storage media holder, and a storage media arranged on at least one of the first and second storage media holders. The data storage device also includes a first head module independently moveably mounted relative to the storage device. The first head module includes at least one of a read element and a write element. In addition, the data storage device includes a second head module independently moveably mounted relative to the storage device. The second head module includes at least one of a read element and a write element operatively associated with the at least one of a read element and write element of the first head module. The second head module is selectively shiftable relative to the first head module in order to align the at least one of the read element and the write element of the first head module and the at least one of the read element and the write element of the second head module to one another and the storage media.

According to another exemplary embodiment of the invention, a method of aligning read elements and write elements with a storage media in a data storage device includes determining a position of a data track associated with the storage media, shifting one of a first and second head module relative to the storage media. The first head module includes at least one of a read element and a write element and the second head module includes at least one of a read element and a write element operatively associated with the at least one of the read element and write element of the first head module. The first head module is selectively shiftable relative to the second head module. The method further includes aligning one of the at least one read element and write element of the one of the first and second head module that is shifted with the data track on the storage media.

According to yet another exemplary embodiment of the invention, a head module assembly for a date storage device includes a first head module independently moveably mounted relative to the storage device. The first head module includes at least one of a read element and a write element. The head module assembly also includes a second head module independently moveably mounted relative to the storage device. The second head module includes at least one of a read element and a write element operatively associated with the at least one of a read element and write element of the first head module. The second head module is selectively shiftable relative to the first head module in order to align the at least one of the read element and the write element of the first head module and the at least one of the read element and the write element of the second head module to one another.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
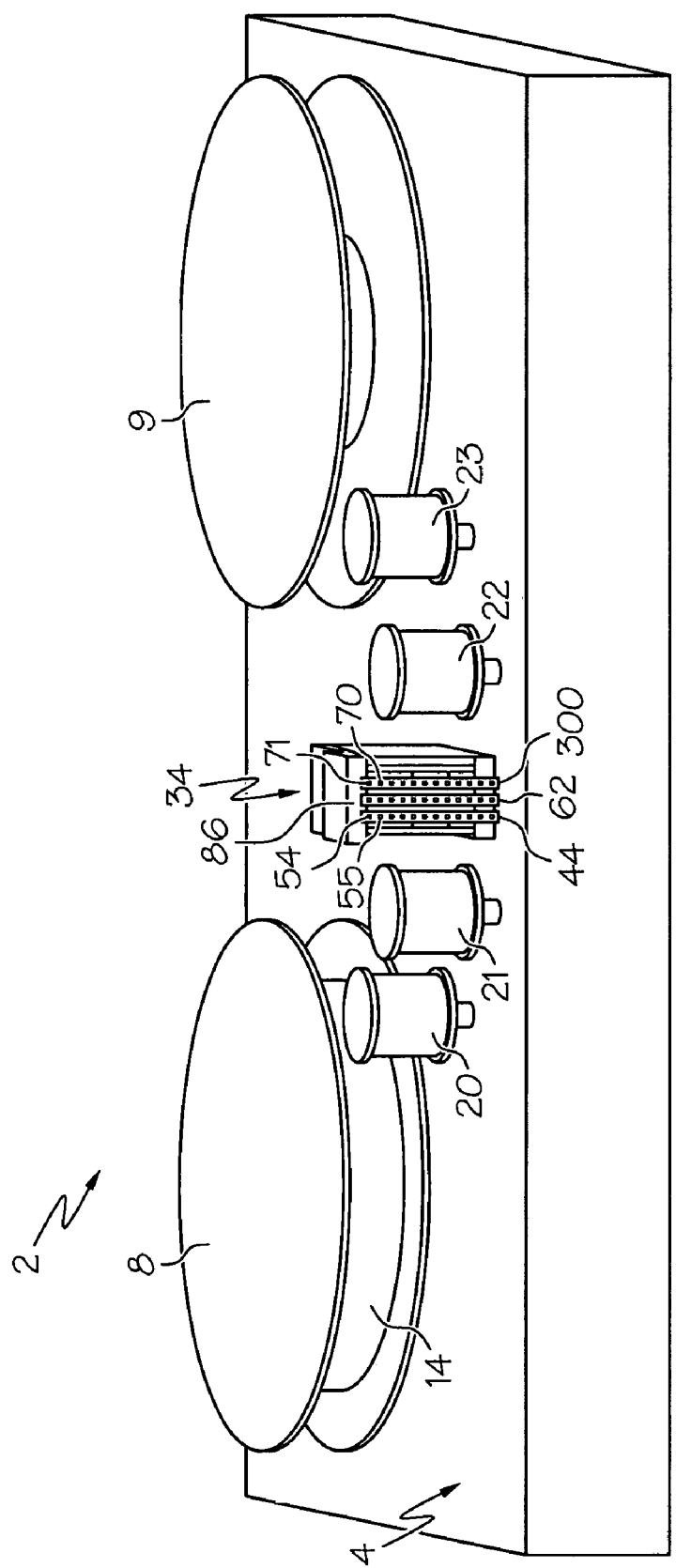
FIG. 1 is a front perspective view of a data storage device constructed in accordance with exemplary embodiments of the invention.

With initial reference to FIG. 1, a data storage device constructed in accordance with exemplary embodiments of the invention is indicated generally at 2. Data storage device 2 includes a main body 4 that houses various electronics (not shown). Data storage device 2 further includes a first storage media holder or reel 8 and a second storage media holder or reel 9. First reel 8 is shown to include a storage media 14 that passes across a plurality of storage media guides 20-23 and is picked up on second reel 9. Data is written to, and read from, storage media 14 by a head actuator assembly indicated generally at 34. As will be discussed more fully below, head actuator assembly 34 must be properly aligned with storage media 14 in order to ensure proper reading, writing, and verifying of data.

Figure 2:
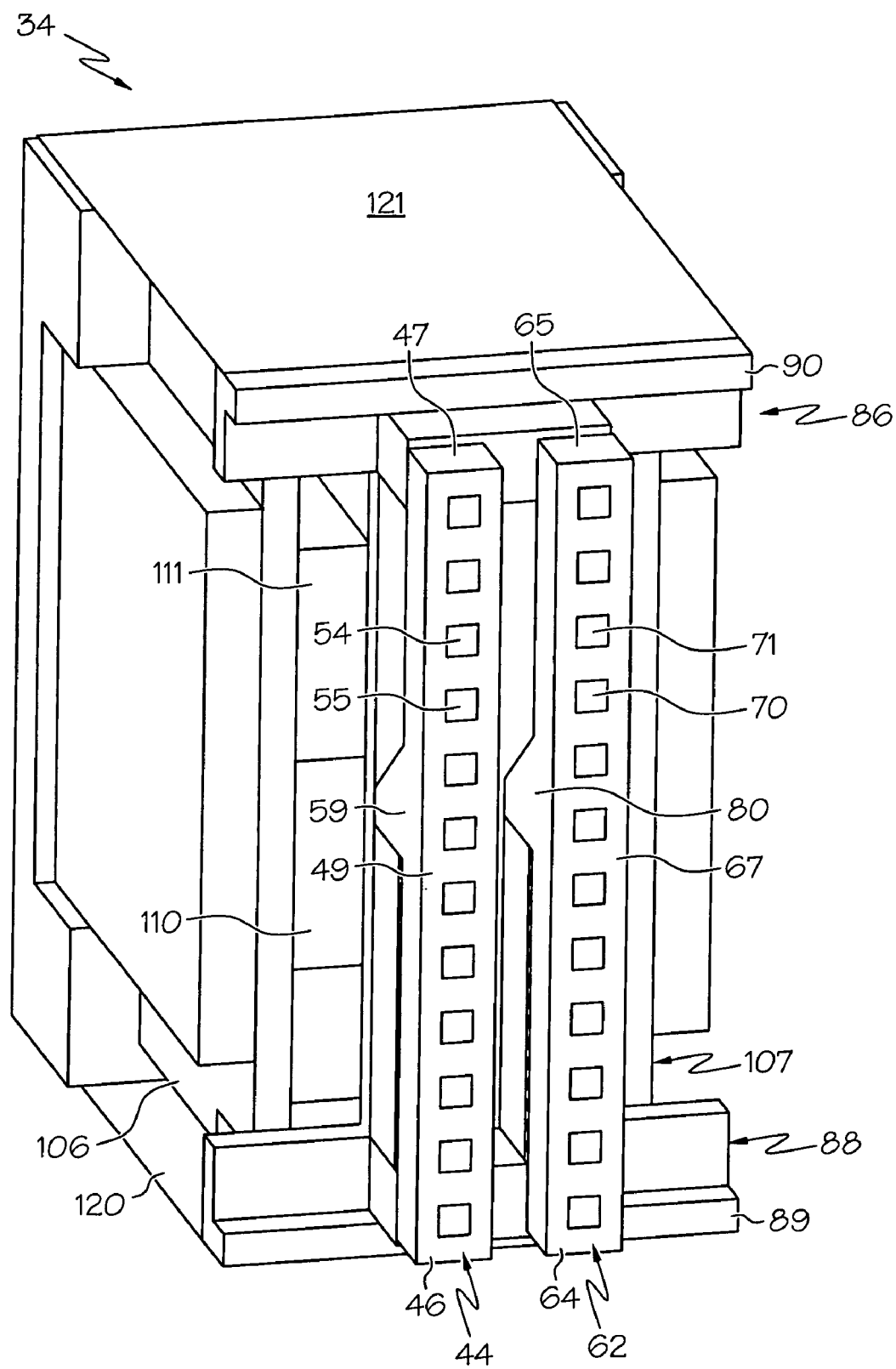
FIG. 2 is an upper left perspective view of a dual actuator constructed in accordance with exemplary embodiments of the invention.
Figure 3:
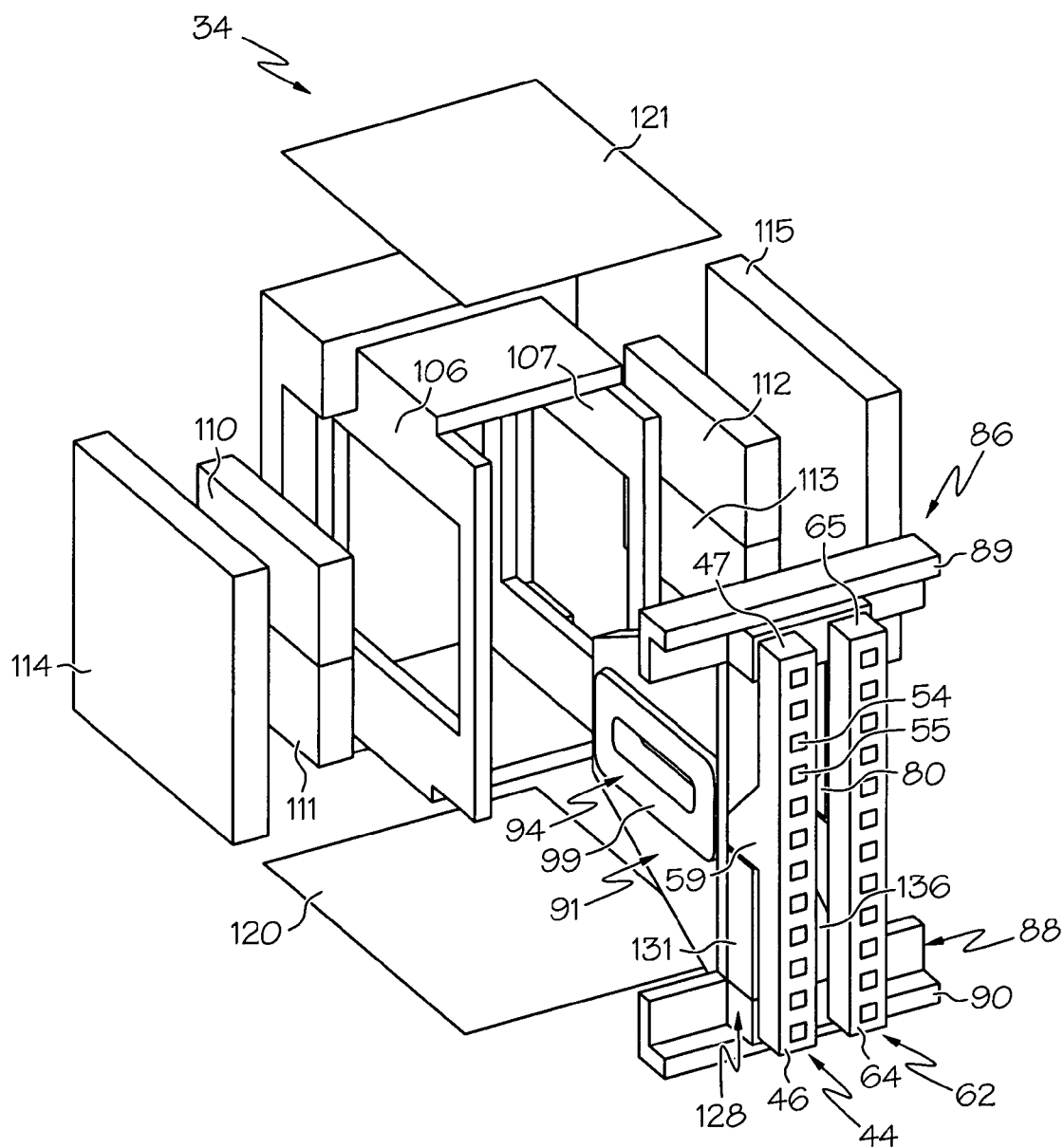
FIG. 3 is an exploded view of the dual actuator of FIG. 2.

As best shown in FIGS. 2-3, head actuator assembly 34 includes a first head module 44 having a first end portion 46 that extends to a second end portion 47 through a data surface 49. First head module 44 includes a plurality of read elements, one of which is indicated at 54, as well as a plurality of write elements, one of which is indicated at 55. Read elements 54 and write elements 55 are arranged in a staggered arrangement, i.e., one after the other along data surface 49. Of course, other aspects of the invention could include read and write elements aligned with one another. First head module 44 also includes an actuator portion 59 that extends laterally outward away from data surface 49.

Head actuator assembly 34 also includes a second head module 62 that is movably mounted relative to first head module 44. In a manner similar to that described above, second head module 62 includes a first end portion 64 that extends to a second end portion 65 through a data surface 67.

Second head module 62 includes a plurality of read elements, one of which is indicated at 70, as well as a plurality of write elements, one of which is indicated at 71. In the exemplary embodiment shown, read elements 70 and write elements 71 are arranged in a staggered configuration along data surface 67. More specifically, read elements 70 are arranged opposite write elements 55 on first head module 44, while write elements 71 are arranged adjacent to read elements 54. With this arrangement, data is read and written or written and read, depending upon the operation, in order to verify data being read from or stored to storage media 14. In a manner also similar to that described above, second head module 62 includes an actuator portion 80 that extends laterally outward away from data surface 67. In order to ensure proper alignment between the plurality of read elements 54 on first head module 44 and write elements 51 on second head module 62, as well as the write elements 55 and read elements 70, each head module 44 and 62 is moveable relative to one another and head actuator assembly 34 in a manner that will be described more fully below. Towards that end, each head module 44 and 62 is mounted to an actuator member assembly 86 that is moveably mounted in head actuator assembly 34.

As shown, actuator member assembly 86 includes a main body 88 having a first end 89 that extends to a second end 90. Actuator member assembly 86 further includes an actuator housing 91 (FIG. 3) that supports a first-stage actuator assembly 94. First-stage actuator assembly 94 includes a first-stage actuator element 99 that is selectively operated to move first and second head modules 44 and 62 relative to storage media 14. First-stage actuator assembly 94 provides a first, or gross, adjustment of first and second head modules 44 and 62 relative to storage media 14 in order to properly align the plurality of read elements 54 and 70, and write elements 55 and 71 with particular sectors on storage media 14.

In the exemplary embodiment shown, first-stage actuator element 99 takes the form of a coil that is selectively energized to move first and second head modules 44 and 62. In order to actuate first-stage actuator element 99, head actuator assembly 34 includes a first magnet support 106 positioned on a first side (not separately labeled) of actuator member assembly 86 and a second magnet support 107 positioned on an second, opposing side (not separately labeled) of actuator member assembly 86. Magnet support 106 supports a pair of magnets 110 and 111 that are in operative communication with first-stage actuator element 99. Likewise, second magnet support 107 supports a pair of magnets 112 and 113, which are likewise in operative communication with first-stage actuator element 99. In order to increase the force generated by the actuator, the assembly may also include a first magnet yoke 114 mounted on magnet pair 110 and 111, and a second magnet yoke 115 mounted on magnet pair 112 and 113. Once energized, first-stage actuator element 99 shifts actuator member assembly 86 that, in turn, shifts first and second head modules 44 and 62 relative to storage media. First-stage actuator element 99 has a range of motion of between about 1 mm and about 10 mm. In order to restrain the movement and restore actuator member assembly 86 to a home position, a first spring 120 is arranged at first end 89 and a second spring 121 is arranged at second end 90. Of course it should be understood that other actuating elements, such as piezo-electric elements and the like could also be employed.

In addition to the gross adjustment provided by first-stage actuator element 99, head actuator assembly 34 includes a second-stage actuator assembly 128 that facilitates a fine or micro level of adjustment to provide additional, or a microtuning, adjustment to enhance alignment between read elements 54 with write elements 71 and write elements 55 with read elements 70. Towards that end, second-stage actuator assembly 128 includes a first second-stage actuator element 131 that is operatively connected to first head module 44 and a second, second-stage actuator element 36 that is operatively connected to second head module 62. More specifically, first second-stage actuator element 131 acts upon actuator portion 59 to move first head module 44 and second, second-stage actuator element 136 acts upon actuator portion 80 to move second head module 62. In this manner, first and second second-stage actuator elements 131 and 136 are selectively activated to provide fine tuning adjustments between first head module 44 and second head module 62. That is, second-stage actuator assembly 128 facilitates movement of first and second head modules 44 and 62 relative to one another. Towards that end, first and second second-stage actuator elements 131 and 136 have a range of motion of between about 10 microns and about 100 microns. In the exemplary embodiment shown, first and second second-stage actuator elements take the form of piezo elements however, it should be understood that other elements, such as voice coils could also be employed.

Figure 4:
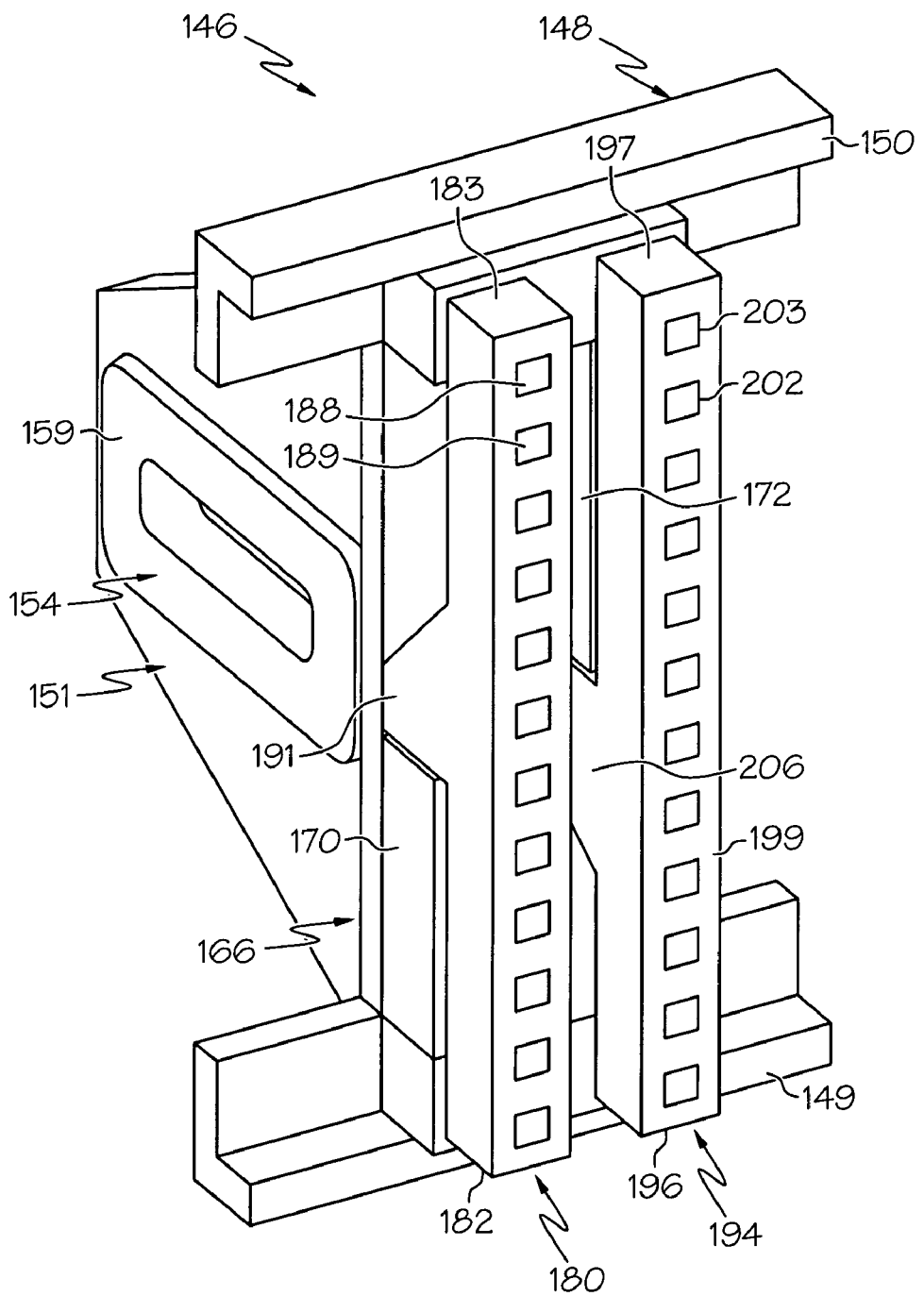
FIG. 4 is an upper left perspective view of an actuator member assembly in accordance with exemplary embodiments of the invention.

Reference will now be made to FIG. 4 in describing an actuator member assembly 146 constructed in accordance with another exemplary embodiment of the invention. As shown, actuator member assembly 146 includes a main body 148 having a first end 149 that extends to a second end 150. Actuator member assembly 146 further includes an actuator housing 151 that supports a first-stage actuator assembly 154. In a manner similar to that described above, first-stage actuator assembly 154 includes a first-stage actuator element 159 that, in the exemplary embodiment shown, takes the form of a voice coil. Actuator member assembly 146 further includes a second-stage actuator assembly 166 having a first second-stage actuator element 170 and a second, second-stage actuator element 172. As will be discussed more fully below second, second-stage actuator element 172 is off-set from first second-stage actuator element 170 in order to negate any need to counterbalance movement within actuator member assembly 146.

In accordance with the exemplary embodiment shown, actuator member assembly 146 includes a first head module 180 having a first end portion 182 that extends to a second end portion 183 through a data surface 185. In a manner similar to that described above, data surface 185 includes a plurality of read elements, one of which is indicated at 188 as well as a plurality of write elements, one of which is indicated at 189. Read elements 188 and write elements 189 are arranged staggered, i.e., one after the other, along data surface 185. It should be noted that pairs of read and write elements can also be arranged such that they are aligned with each other. First head module 180 also includes an actuator portion 191. As shown, actuator portion 191 is arranged in a first orientation. More specifically, actuator portion 191 includes an actuator surface (not separately labeled) facing first end portion 182. Actuator member assembly 146 further includes a second head module 194 having a first end portion 196 that extends to a second end portion 197 through a data surface 199. Second head module 194 includes a plurality of read elements, one of which is indicated at 202, as well as a plurality of write elements, one of which is indicated at 203, arranged in a staggered relationship in a manner similar to that described above. In addition, head module 194 includes an actuator portion 206. However, in contrast to the orientation of actuator element 191, actuator portion 206 is arranged in a second orientation. More specifically, actuator portion 206 includes an actuator surface (not separately labeled) facing second end portion 197. With this arrangement, forces applied by first second-stage actuator element 170 are balanced by forces applied by second, second-stage actuator element 172. In this manner, balancing movement between first and second head modules 180 and 194 is not required and thus control schemes are simplified.

Figure 5:
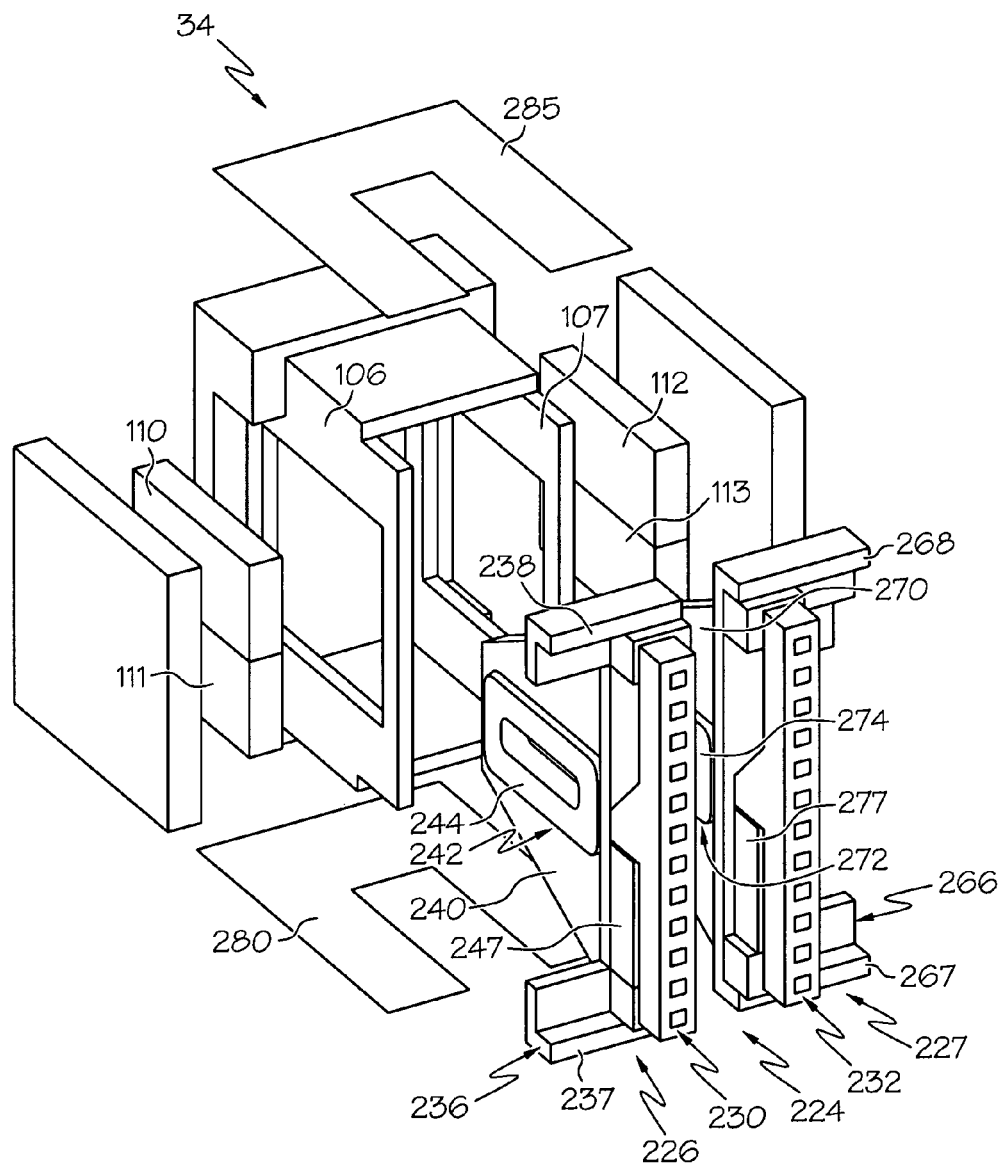
FIG. 5 is an exploded view of a dual actuator constructed in accordance with exemplary embodiments of the invention.

Reference will now be made to FIG. 5, wherein like reference numbers represent corresponding parts and their respective views, in describing a head member assembly 224 constructed in accordance with yet another exemplary embodiment of the invention. As shown, head member assembly 224 includes a first actuator member assembly 226 and a second actuator member assembly 227. First actuator member assembly 226 includes a first head module 230 and second actuator member assembly 227 includes a second head module 232. With this arrangement, first actuator member assembly 226 is independently moveable relative to second actuator assembly 227 and, by extension, each head module 230 assembly is independently moveable relative to head module 232. Towards that end, first actuator member assembly 226 includes a main body 236 having a first end 237 that extends to a second end 238 between which is positioned first head module 230. In addition, first actuator member assembly 226 includes an actuator housing 240 that supports a first-stage actuator assembly 242 having a first, first-stage actuator element 244. First actuator member assembly 226 is also shown to include a first, second-stage actuator element 247. In a manner similar to that described above, first-stage actuator element 244 provides gross adjustments for first head module 230 while first, second-stage actuator element 247 provides fine adjustments. It will also be understood that operation is also possible using only the first stage of actuation.

In a manner similar to that described above, second actuator member assembly 227 includes a main body 266 having a first end 267 that extends to a second end 268 between which is positioned second head module 232. Second actuator member assembly 227 also includes an actuator housing 270 having a second, first-stage actuator assembly 272 provided with a second, first-stage actuator element 274. Second actuator member 227 also includes a second, second-stage actuator element 277. With this arrangement, second, first-stage actuator element 274 provides gross adjustment of second head module 232 while second, second-stage actuator element 277 provides fine tuning in order to ensure that read and write elements arranged on first head module 230 are properly aligned with corresponding read and write elements on head module 232. Moreover, by mounting each head module 230 and 232 on a separate actuator member assembly 226, 227, head member assembly 224 facilitates complete independent actuation in both the first and second-stages in order to provide proper alignment is facilitated. In a manner similar to that described above, in order to restrain the movement and restore each actuator member assembly 226, 227 to a home position, a first spring 280 is arranged at first ends 237 and 267 and a second spring 285 is arranged at second ends 238 and 268. As shown, each spring 280, 285 is split in order to accommodate independent movement of each respective actuator member assembly 226, 227.

At this point it should be understood that exemplary embodiments of the invention provide a system for facilitating not only gross adjustment of head modules but, fine independent adjustment of associated head modules in order to enhance read/write accuracy and data integrity for a data storage device. In addition, data storage device 2 can be provided with a third head module 300 (FIG. 1) provided with read and/or write elements (not separately labeled). Third head module 300 is associated with first and second head modules 44 and 62 and is selectively shiftable relative to first and/or second head modules 44 and 62 in order to still further enhance read/write accuracy and data integrity for a data storage device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of exemplary embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The exemplary embodiments were chosen and described in order to best explain the principles of the invention and the practical application, and to enable others of ordinary skill in the art to understand the invention for various embodiments with various modifications as are suited to the particular use contemplated While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A data storage device including a storage media comprising:
   a main body supporting a first storage media holder and a second storage media holder;
   a storage media arranged on at least one of the first and second storage media holders;
   a head actuator mounted between the first and second media holders;
   a first head module mounted to the head actuator, the first head module including at least one read element and at least one a write element; and
   a second head module mounted to the head actuator, the second head module including at least one read element and at least one write element operatively associated with corresponding ones of the at least one read element and at least one write element of the first head module, wherein the head actuator selectively shifts the first and second head modules in unison and wherein the first head module and second head module are selectively shiftable relative to each other in order to align the at least one read element and the at least one write element of the first head module and the at least one read element and the at least one write element of the second head module with one another and the storage media.

2. The data storage device according to claim 1, wherein the head actuator comprises a first-stage actuator element configured and disposed to provide gross adjustment of the first and second head modules.

3. The data storage device according to claim 2, further comprising: at least one second-stage actuator element operatively coupled to at least one of the first and second head modules, the at least one second-stage actuator element being selectively operated to shift the at least one of the first and second head modules relative to the other of the first and second head modules.

4. The data storage device according to claim 3, wherein the at least one second-stage actuator element includes a first second-stage actuator element and a second, second-stage actuator element, the first second-stage actuator element being operatively connected to the first head module and the second, second-stage actuator element being operatively connected to the second head module, each of the first and second, second-stage actuator elements being selectively operated to shift corresponding ones of the first and second head modules relative to one another.

5. The data storage device according to claim 3, wherein the at least one second-stage actuator element is a piezo element.

6. The data storage device according to claim 1, further comprising: a third head module operatively associated with at least one of the first and second head modules, the third head module including at least one of a read element and a write element, the third head module being selectively shiftable relative to at least one of the first head module and the second head module.

7. A head module assembly for a date storage device comprising:
    a head actuator mounted between the first and second media holders;
    a first head module mounted to the head actuator, the first head module including at least one read element and at least one write element;
    a second head module mounted to the head actuator, the second head module including at least read element and at least one write element operatively associated with the at least one read element and at least one write element of the first head module, the second head module, wherein the head actuator selectively shifts the first and second head modules in unison and wherein the first head module and second head module are selectively shiftable relative to each other in order to align the at least one read element and the at least one write element of the first head module and the at least one read element and the at least one write element of the second head module with one another.

8. The head module assembly according to claim 7, wherein the head actuator comprises a first-stage actuator element configured and disposed to provide gross adjustment of the first and second head modules.

9. The head module assembly according to claim 8, further comprising: at least one second-stage actuator element operatively coupled to at least one of the first and second head modules, the at least one second-stage actuator element being selectively operated to shift the at least one of the first and second head modules relative to the other of the first and second head modules.

10. The head module assembly according to claim 9, wherein the at least one second-stage actuator element includes a first second-stage actuator element and a second, second-stage actuator element, the first second-stage actuator element being operatively connected to the first head module and the second, second-stage actuator element being operatively connected to the second head module, each of the first and second, second-stage actuator elements being selectively operated to shift corresponding ones of the first and second head modules relative to one another.

11. The head module assembly according to claim 7, further comprising: a third head module mounted to the head actuator, the third head module including at least one of a read element and a write element, the third head module being selectively shiftable relative to at least one of the first head module and the second head module.

12. The data storage device according to claim 1, wherein the at least one read element and the at least one write element of the first head module are arranged in a single linear array on the first head module, and the at least one read element and the at least one write element of the second head module are arranged in a single linear array on the second head module.

13. The head module assembly according to claim 7, wherein the at least one read element and the at least one write element of the first head module are arranged in a single linear array on the first head module, and the at least one read element and the at least one write element of the second head module are arranged in a single linear array on the second head module.

* * * * *